United States Patent Office 2,724,009
Patented Nov. 15, 1955

2,724,009

RUBBER COMPOSITIONS AND RUBBER TIRE TREADS

Rudolf Kern, Neustadt (Haardt), Germany, assignor to Rhein-Chemie G. m. b. H., Heidelberg, Germany, a company of Germany No Drawing. Application October 20, 1951, Serial No. 252,417

Claims priority, application Germany October 28, 1949

6 Claims. (Cl. 260—761)

This invention relates to a process for the manufacture of rubber compositions and is especially concerned with the compounding of such compositions. The invention relates also to rubber tires for automobiles and other vehicles.

The primary object of my invention is to generally improve rubber compositions and rubber tire treads, and a more specific object is to improve their mechanical properties.

To accomplish the foregoing objects and others which will hereinafter appear, my invention resides in the compositions and the method of producing same, as are more particularly described in the following specification and sought to be defined in the appended claims.

According to my present invention, I use lactams or lactam-bearing materials as addition agents for rubber compositions.

The following lactams, as I have found out, are suitable for the process of my invention: Butyrolactam, ε-aminocaprolactam, p-methyl - ε - aminocaprolactam, α-pyrrolidone, ketolactam and nucleus-substituted lactams, such as, for example, N-dodecyl, N-oleoyl caprolactam, also N-alkyl, N-ethyl, and N-acyl pyrrolidones, such as, N-methyl, N-octadecyl, N-staeroyl, phenyl pyrrolidone, enantholactam, ω-amino-octylic acid lactam and ω-amino-nonylic acid lactam, ω-amino-decylic acid lactam, ω-amino-undecylic acid lactam. Mixtures of lactams may also be used as addition agents.

By adding any of the above mentioned compounds or their substitution products of any kind to rubber compositions, the vulcanizates or finished products obtained therefrom are given improved mechanical properties. Especially their strength will increase.

At the same time, a desirable plasticizing effect is observed. By adding lactams to rubber formulations high in embrittling fillers, it is, therefore, possible to obtain compositions of such molding and working properties as are not obtainable without the addition.

I have found that the grade of purity of the lactams used is not essential and that technical grades can be employed successfully.

Without impairing the final result, one may add to rubber compositions residues remaining in the production of lactams, such as are obtained, for example, in the distillation of ε-aminocaprolactam.

Lactam-bearing products which may be used for the purpose of my invention may comprise, in addition to monomeric lactams, polymers of a low polymerization degree. Such products are formed through polymerization or polycondensation of lactams.

With equal success I have used lactam-bearing products which are obtained through extraction of polymerizates or polycondensates of lactams, or through depolymerization of polycondensates or of mixtures comprising polycondensates.

If desirable, one may also use mixtures of these lactams or lactam-bearing materials with each other or with other dispersing agents, softeners, reinforcing fillers, antioxidation agents, or other addition agents.

The addition agents of my invention are especially suitable for rubber compositions which contain light-colored fillers, such as, oxides, especially oxides of magnesium, aluminum, zinc, lead, etc., or silicates, e. g. those of calcium or aluminum, or carbonates, such as, calcium or magnesium carbonates.

Lactams or lactam-bearing products are particularly beneficial when added to rubber formulations containing, for example, pyrogenic silica, silica gel, alumina gel, aluminum oxide hydrates, calcium silicates, etc., or mixtures of these fillers with each other or with different fillers, such as, for example, carbon black.

Desirable effects are also observed with rubber formulations comprising carbon black.

The amount of lactams or lactam-bearing products added may vary within wide limits. It depends on the nature of the compound serving as a dispersing agent, the kind and quantity of the filler, and on the desired physical and technological properties of the rubber compositions to be produced.

Treads of automobile tires have been made so far exclusively from rubber formulations containing carbon black. Although the use of this filler involves a number of disadvantages which will be mentioned hereinafter, it had to be employed since none of the numerous other fillers suggested up to this time would impart to the tread the necessary minimum strength and wear resistance.

Treads manufactured with carbon black have the great disadvantage of a strong damping action and of getting warm during use due to internal friction. The temperature rise may amount to as much as 90° C. or even more and seriously impair the mechanical qualities of the rubber, particularly its abrasion resistance, thus reducing the useful life of the tire substantially.

The heat also damages the fabric base of the tire. The cellulose materials used, such as cotton or rayon, are structurally weakened by continuous heat and the mechanical action so that the tire may be destroyed due to the fabric becoming brittle. Even if this extreme condition is not reached, it happens often enough that carcasses with worn down treads cannot be retraded any more because of heat damage done to the fabric base. This disadvantage is of particular importance with tires of large dimensions, such as are used for trucks, tractors and other heavy duty equipment.

Attempts to avoid these disadvantages of a carbon black-bearing rubber formulation by replacing carbon black with other fillers have not led to results so far which can be considered generally satisfactory.

Light-colored fillers of the silicate type, such as calcium silicate, or alumina gels, have been excluded from practical use because of the poor wearing characteristics of the treads made from them. Better results were obtained with pyrogenic silica which, on the other hand, has the disadvantage that compositions containing it are difficult to work. With these compounds, it was also impossible to achieve good damping and wear resistance.

I have now found that the workability of rubber compositions into tires, and at the same time the wearing quality of the tires produced, can be considerably improved by using for the treads rubber formulations which contain light-colored fillers with the addition of ε-aminocaprolactam or residues from the distillation of ε-aminocaprolactam.

The lactam, according to the invention, is added to compositions of natural rubber, and as fillers I use at least a single synthetically prepared light-colored hydrophylic inorganic filler, such as alumina gel, pyrogenic silica, and aluminum silicate.

The following examples show rubber compositions according to this invention and their mechanical properties. As can be seen from these examples, the addition agents used improve the tear resistance to values several times higher than those observed in blank tests without the use of these addition agents.

Example 1

The rubber formulation used consisted of:

| | |
|---|---|
| Crepe | 100 |
| Zinc oxide, active | 3 |
| Sulfur | 3 |
| Mercaptobenzothiazole disulfide | 1 |
| Diphenylguanidine | 0.5 |
| Alumina gel | 60 |
| ε-Aminocaprolactam 60% | 3.6 |

The vulcanizate had the following physical properties, as compared with those of a composition not containing ε-aminocaprolactam:

| Curing cycle | 60 min., 45 p. s. i. | |
|---|---|---|
| Breaking strength, kg./sq. cm | 210 | 180 |
| Elongation, percent | 567 | 577 |
| Modulus: | | |
| 300%, kg./sq. cm | 71 | 56 |
| 500%, kg./sq. cm | 164 | 132 |
| Tear resistance, kg./cm | 40 | 11 |
| Cut growth resistance, kg./cm | 65 | 48 |
| Shore hardness | 61 | 56 |
| Shock elasticity, percent | 56 | 57 |

Example 2

The following formulation was used:

| | |
|---|---|
| Crepe | 100 |
| Zinc oxide, active | 3 |
| Sulfur | 3 |
| Mercaptobenzothiazole disulfide | 1 |
| Diphenylguanidine | 0.5 |
| Pyrogenic silica | 25 |
| ε-Aminocaprolactam 60% | 3.6 |

After vulcanizing, the following test results were obtained, as compared with those observed without the addition agent:

| Curing cycle | 60 min., 45 p. s. i. | |
|---|---|---|
| Tensile strength, kg./sq. cm | 191 | |
| Elongation, percent | 593 | |
| Modulus: | | |
| 300%, kg./sq. cm | 69 | |
| 500%, kg./sq. cm | 141 | |
| Tear resistance, kg./cm | 72 | 50 |
| Cut growth resistance, kg./cm | 74 | 58 |
| Shock elasticity, percent | 36 | 33 |

Example 3

The following formulation was used:

| | |
|---|---|
| Smoked sheets | 100 |
| Sulfur | 3 |
| Zinc oxide, active | 5 |
| Dibenzothiazyl disulfide | 1 |
| Carbon black as used for electrodes | 40 |
| 33% aqueous solution of technical aminocaprolactam (obtained by depolymerization of polyamides) | 5 |

Test results obtained after vulcanization with and without the lactam were, respectively:

| Curing cycle | 30 min., 135° C. | |
|---|---|---|
| Tensile strength, kg./sq. cm | 243 | 135 |
| Elongation, percent | 500 | 507 |
| Modulus: | | |
| 300%, kg./sq. cm | 113 | 50 |
| 500%, kg./sq. cm | 243 | 128 |
| Cut growth resistance, kg./cm | 15 | 3 |
| Shore hardness | 63 | 50 |
| Shock elasticity | 60 | 53 |
| Wear | 144 | 214 |
| Defo hardness elasticity | 1,750/17 | 1,800/17 |

Example 4

The rubber formulation used consisted of:

| | |
|---|---|
| Smoked sheets | 100 |
| Sulfur | 3 |
| Zinc oxide, active | 5 |
| Dibenzothiazyl disulfide | 1 |
| Diphenylguanidine | 0.5 |
| Alumina gel | 50 |
| 35% aqueous solution of the residue from lactam distillation | 5 |

Test results after vulcanization with and without the lactam, respectively, were as follows:

| Curing cycle | 15 min., 135° C. | |
|---|---|---|
| Tensile strength, kg./sq. cm | 257 | 224 |
| Elongation, percent | 560 | 540 |
| Modulus: | | |
| 300%, kg./sq. cm | 79 | 72 |
| 500%, kg./sq. cm | 204 | 191 |
| Cut growth resistance, kg./cm | 32 | 6 |
| Shore hardness | 57 | 56 |
| Shock elasticity, percent | 65 | 63 |
| Wear | 166 | 191 |
| Defo hardness elasticity | 1,400/20 | 1,900/17 |

Example 5

The rubber formulation used consisted of:

| | |
|---|---|
| Smoked sheets | 100 |
| Sulfur | 3 |
| Zinc oxide, active | 5 |
| Dibenzothiazyl disulfide | 1 |
| Aluminum silicate | 50 |
| Mixture of 60 parts lactam distillation residue and 40 parts zinc oleate | 5 |

After vulcanization, the following test results were obtained, respectively, with and without the reinforcing agent:

| Curing cycle | 135° C., 30 min. | |
|---|---|---|
| Tensile strength, kg./sq. cm | 234 | 135 |
| Elongation, percent | 513 | 480 |
| Modulus: | | |
| 300%, kg./sq. cm | 99 | 61 |
| 500%, kg./sq. cm | 220 | 135 |
| Cut growth resistance, kg./cm | 36 | 2.6 |
| Shore hardness | 65 | 55 |
| Shock elasticity, percent | 60 | 57 |
| Wear | 195 | 229 |
| Defo hardness elasticity | 1,800/16 | 3,500/35 |

Example 6

The rubber formulation used consisted of:

| | |
|---|---|
| Smoked sheets | 100 |
| Crepe | 50 |
| Sulfur | 2.5 |
| Zinc oxide "Rotsiegel" | 8 |
| Reaction product of mercaptobenzothiazole with cyclohexylamine | 1 |
| Pyrogenic silica | 18 |
| Stearic acid | 2 |
| Colophonium | 1 |
| Phenyl-β-naphthylamine | 1 |
| Ozokerite | 2.5 |
| Mixture of 85 parts lactam distillation residue and 15 parts zinc salt of rape seed fatty acid | 6 |

After vulcanization, the following test results were obtained with and without the dispersing agent, respectively:

| Curing cycle | 143° C., 20 min. | |
| --- | --- | --- |
| Tensile strength, kg./sq. cm. | 300 | 250 |
| Elongation, percent | 675 | 663 |
| Modulus: | | |
| 300%, kg./sq. cm. | 42 | 33 |
| 500%, kg./sq. cm. | 138 | 112 |
| Cut growth resistance, kg./cm. | 30 | 29 |
| Shore hardness | 59 | 55 |
| Shock elasticity | 64 | 62 |
| Wear | 104 | 104 |
| Defo hardness elasticity | 1,000/15 | 1,300/62 |

Example 7

The rubber formulation used consisted of:

| | |
| --- | --- |
| Smoked sheets | 100 |
| Sulfur | 3 |
| Zinc oxide, active | 5 |
| Dibenzothiazyl disulfide | 1 |
| Carbon black as used for electrodes | 40 |
| A paste made from 30% distillation residues 30% water 40% silicious chalk | 5 |

The following test results were obtained after vulcanization with and without the activator, respectively:

| Curing cycle | 135° C., 30 min. | |
| --- | --- | --- |
| Tensile strength, kg./sq. cm. | 244 | 135 |
| Elongation, percent | 530 | 507 |
| Modulus: | | |
| 300%, kg./sq. cm. | 96 | 50 |
| 500%, kg./sq. cm. | 218 | 128 |
| Cut growth resistance, kg./cm. | 21 | 3 |
| Shore hardness | 61 | 50 |
| Shock elasticity, percent | 58 | 53 |
| Wear | 166 | 214 |
| Defo hardness elasticity | 1,500/15 | 1,800/17 |

Example 8

The figures below indicate to what extent lactam-bearing substances can improve the properties of a vulcanizate. The lactam-bearing material used was obtained by depolymerization of process waste from the working of technical polycondensates.

The following rubber formulation was used:

| | |
| --- | --- |
| Smoked sheets | 100 |
| Sulfur | 2.5 |
| Zinc oxide | 5 |
| Dibenzothiazyl disulfide | 1 |
| Diphenylguanidine | 0.5 |
| Alumina gel | 56 |

Three test batches, two of which contained lactam additions as indicated below, yielded the following figures after vulcanization at 135° C. for 30 minutes:

| Lactam addition, percent | 0 | 2.8 | 5.6 |
| --- | --- | --- | --- |
| Shore hardness | 53 | 60 | 61 |
| Cut growth resistance, kg./cm. | 3.7 | 25 | 25 |
| Modulus 300%, kg./sq. cm. | 69 | 85 | 135 |
| Tensile strength, kg./sq. cm. | 175 | 218 | 200 |
| Elongation, percent | 520 | 480 | 500 |

Example 9

| | |
| --- | --- |
| Natural rubber (sheets 50, crepe 50) | 100 |
| Alumina gel | 36 |
| Ceresin | 1 |
| Phenyl-beta-naphthylamine | 1.2 |
| Zinc oxide | 8 |
| Sulfur | 2.5 |
| Reaction product of mercaptobenzothiazole with diethylamine | 1 |
| ε-Amino caprolactam, technical grade, obtained through heat depolymerization of polyamide waste | 6.5 |

This tread formulation showed the following values at tests for mechanical properties:

| | |
| --- | --- |
| Shore hardness | 54 |
| Elasticity | 66 |
| Tear resistance, kg./cm. | 39 |
| Modulus, 300%, kg./sq. cm. | 59 |
| Modulus, 500%, kg./sq. cm. | 168 |
| Breaking strength, kg./sq. cm. | 258 |
| Elongation, per cent | 633 |
| Wear | 115 |
| Specific gravity | 1.12 |

To show the improvements over stearic acid which is frequently added to rubber compositions, the following test results are given. These results were obtained with the same composition, but with stearic acid instead of lactam or the lactam mixture:

| | |
| --- | --- |
| Shore hardness | 59 |
| Elasticity | 58 |
| Tear resistance, kg./sq. cm. | 29 |
| Modulus, 300%, kg./sq. cm. | 55 |
| Modulus, 500%, kg./sq. cm. | 155 |
| Breaking strength, kg./sq. cm. | 251 |
| Elongation, per cent | 600 |
| Wear | 124 |
| Specific gravity | 1.12 |

A damping test gave the following results with these compositions:

| Min. | With Lactam | With Stearic Acid |
| --- | --- | --- |
| 0 | | |
| 5 | 20 | 20 |
| 10 | 31 | 41 |
| 15 | 32 | 47 |
| 30 | 35 | 50 |
| 45 | 39 | 50 |
| | 39 | 50 |

Example 10

| | |
| --- | --- |
| Natural rubber (sheets) | 100 |
| Pyrogenic silica | 22 |
| Ceresin | 0.7 |
| Phenyl-beta-naphthylamine | 1.2 |
| Zinc oxide | 8 |
| Sulfur | 2.5 |
| Reaction product of mercaptobenzothiazole with diethylamine | 1 |
| Mixture of 85 pts. tech. ε-amino caprolactam (see Example 9) with 15 pts. of the zinc salt of rape seed fatty acids | 7 |

Mechanical property tests yielded the following values, as compared to those obtained with a formulation without a lactam-bearing addition agent:

| | With addition | Without addition |
| --- | --- | --- |
| Shore hardness | 56 | 54 |
| Elasticity | 62 | 56 |
| Tear resistance, kg./cm. | 35 | 2.9 |
| Modulus, 300%, kg./sq. cm. | 38 | 29 |
| Modulus, 500%, kg./sq. cm. | 132 | 90 |
| Breaking strength, kg./sq. cm. | 309 | 164 |
| Elongation, percent | 600 | 623 |
| Wear | 112 | 200 |
| Specific gravity | 1.08 | 1.08 |

A damping test gave the following results:

| Min. | Without addition, °C. | With addition, °C. |
| --- | --- | --- |
| 1 | 23 | 23 |
| 2 | 28 | 26 |
| 4 | 33 | 31 |
| 6 | 39 | 33 |
| 8 | 45 | 35 |
| 10 | 50 | 36 |
| 15 | 53 | 38 |
| 30 | 59 | 41 |
| 45 | 62 | 42 |

To compare the results according to the invention with prior art formulations, test results with a tread composition are given below which were published recently. In this composition pyrogenic silica was used as a filler:

| | |
| --- | --- |
| Shore hardness | 58 |
| Elasticity | 56 |
| Tear resistance, kg./cm. | 32 |
| Modulus, 300%, kg./sq. cm. | 59 |
| Modulus, 500%, kg./sq. cm. | 149 |
| Breaking strength, kg./sq. cm. | 259 |
| Elongation, per cent | 610 |
| Wear | 147 |
| Specific gravity | 1.18 |

A tire containing the above formulation in its tread and having the dimensions of 10.00 x 20 was mounted on a truck with a rated capacity of 4.6 tons, but which was always loaded 40% above capacity and which had to pull a trailer of 15 tons. Within 6 months, with these tires and under the load conditions mentioned, the truck was driven 73,437 kilometers without the treads being completely worn off. Several new tires compounded with carbon black which were used for comparison purposes were destroyed after 32,000 kilometers.

Rubber tires made from rubber formulations according to the present invention are especially suitable for use on heavily loaded vehicles and in areas of hot climates because of the relatively small rise of temperature in use.

I claim:

1. In the process according to claim 4, adding said distillation residues mixed with zinc oleate.

2. In the process according to claim 4, adding said distillation residues mixed with the zinc salt of rape seed fatty acid.

3. In the process according to claim 4, adding said agent in an aqueous solution.

4. Process for the manufacture of rubber compositions, comprising compounding natural rubber, an agent of the group consisting of ε-aminocaprolactam and residues from the distillation of ε-aminocaprolactam, and at least a single synthetic light-colored hydrophilic inorganic filler of the group consisting of alumina gel, pyrogenic silica, and aluminum silicate.

5. Tread of vehicular tires, comprising natural rubber, ε-aminocaprolactam, and at least a single synthetically prepared light-colored hydrophilic inorganic filler of the group consisting of alumina gel, pyrogenic silica, and aluminum silicate.

6. The tread according to claim 5, comprising besides said ε-aminocaprolactam the zinc salt of rape seed fatty acid.

References Cited in the file of this patent

UNITED STATES PATENTS

| | | |
| --- | --- | --- |
| 1,864,662 | Miller | June 28, 1932 |
| 2,287,700 | Muskat et al. | June 23, 1942 |
| 2,404,719 | Houtz | July 23, 1946 |
| 2,550,363 | Luten et al. | Apr. 24, 1951 |
| 2,564,992 | Pechukas | Aug. 21, 1951 |